(12) United States Patent
Reimann

(10) Patent No.: US 11,885,892 B2
(45) Date of Patent: Jan. 30, 2024

(54) METHOD FOR ASCERTAINING OUTPUT DATA OF A GNSS LOCATING DEVICE BASED ON GNSS SATELLITE SIGNALS IN VEHICLE

(71) Applicant: Robert Bosch GmbH, Stuttgart (DE)

(72) Inventor: Mathias Reimann, Stuttgart-Sued (DE)

(73) Assignee: Robert Bosch GmbH, Stuttgart (DE)

( * ) Notice: Subject to any disclaimer, the term of this patent is extended or adjusted under 35 U.S.C. 154(b) by 81 days.

(21) Appl. No.: 17/457,208

(22) Filed: Dec. 1, 2021

(65) Prior Publication Data
US 2022/0179100 A1      Jun. 9, 2022

(30) Foreign Application Priority Data
Dec. 3, 2020   (DE) ..................... 10 2020 215 308.6

(51) Int. Cl.
*G01S 19/40*   (2010.01)
*G01S 19/22*   (2010.01)
(52) U.S. Cl.
CPC .............. *G01S 19/40* (2013.01); *G01S 19/22* (2013.01)

(58) Field of Classification Search
CPC ....................................................... G01S 19/40
USPC ..................................................... 342/357.23
See application file for complete search history.

(56) References Cited

U.S. PATENT DOCUMENTS

2021/0156711 A1\* 5/2021 Flade ..................... G01C 25/00

\* cited by examiner

*Primary Examiner* — Harry K Liu
(74) *Attorney, Agent, or Firm* — Maginot, Moore & Beck LLP

(57) ABSTRACT

A method for ascertaining output data of a global navigation satellite system (GNSS) locating device based on GNSS satellite signals in a vehicle, includes a) receiving surroundings data from the surroundings of the vehicle, b) generating a surroundings model to describe the surroundings of the vehicle using the surroundings data received in step a), c) receiving GNSS satellite signals from GNSS satellites using a GNSS receiver, and d) ascertaining output data of the GNSS locating device from the GNSS satellite signals received in step a). The surroundings model generated in step b) is used to compensate for anomalies caused by the surroundings of the propagation of the GNSS satellite signals from the GNSS satellites to the GNSS receiver.

17 Claims, 2 Drawing Sheets

METHOD FOR ASCERTAINING OUTPUT DATA OF A GNSS LOCATING DEVICE BASED ON GNSS SATELLITE SIGNALS IN VEHICLE

This application claims priority under 35 U.S.C. § 119 to patent application no. DE 10 2020 215 308.6, filed on Dec. 3, 2020 in Germany, the disclosure of which is incorporated herein by reference in its entirety.

The disclosure relates to a method for ascertaining output data of a GNSS locating device based on GNSS satellite signals in a vehicle. Furthermore, a computer program, a machine-readable storage medium, and a GNSS locating device are specified. The disclosure can be used in particular in GNSS-based locating systems for autonomous or partially autonomous driving.

BACKGROUND

Satellite navigation is used, for example, in driver assistance and/or for at least partially automating the driving operation of vehicles. However, it can be observed that satellite navigation can be subject to comparatively large error sources. These include, for example, impairments of the signal routes through the atmosphere and impairments of the signal routes through objects in the surroundings of GNSS receivers. One of the largest error sources in this case is the multipath propagation of the satellite systems (GNSS), caused by reflections on objects in the surroundings of the GNSS receiver.

In conventional GNSS systems, attempts have already been made to compensate for corresponding influences using map comparison methods (for example "street pinning"). These methods are only usable to a limited extent in the field of safety-relevant navigation, for example in automated driving due to safety considerations. In more and more vehicles, the surroundings are detected by sensors (so-called perception). This surroundings information is presently used in particular for driver assistance systems, for example proximity warning systems.

Against this background, efforts are being made to improve the accuracy and/or reliability of satellite navigation.

SUMMARY

A method is proposed here for ascertaining output data of a GNSS locating device based on GNSS satellite signals in a vehicle, at least having the following steps:
a) receiving surroundings data from the surroundings of the vehicle,
b) generating a surroundings model to describe the surroundings of the vehicle by means of the surroundings data received in step a),
c) receiving GNSS satellite signals from GNSS satellites using a GNSS receiver,
d) ascertaining output data of the GNSS locating device from the GNSS satellite signals received in step a), wherein the surroundings model generated in step b) is used to compensate for anomalies of the propagation of the GNSS satellite signals caused by the surroundings from the GNSS satellites to the GNSS receiver.

Steps a), b), c), and d) can be carried out, for example, at least once and/or repeatedly in the indicated sequence to carry out the method. Furthermore, steps a), b), c), and d), in particular steps a), b), and c) can be carried out at least partially in parallel or simultaneously. In particular, step b) can be carried out once for a vehicle (or a locating device) or a plurality of vehicles (or locating devices) and/or externally to the vehicle. Furthermore, steps a), c), and d) can be carried out more often than step b) and/or internally in the vehicle.

The method is used in particular to take into consideration possible obstacles in the satellite signal propagation by using items of surroundings sensor information. The method can advantageously contribute here to improved multipath propagation suppression and/or to correcting multipath propagations. Alternatively or additionally to multipath suppression by indirect parameters, for example signal strength and/or noise of GNSS satellite signals, a surroundings sensor-based compensation of multipath propagation effects can be carried out here. Algorithms can be applied here, for example, which compensate for the multipath propagation effects based on measurement, in particular based on measurements of surroundings sensors of the vehicle. This can contribute to a significant increase of the precision and in particular the integrity of the GNSS locating. In particular, an advantageously higher availability can be enabled by multipath corrections.

The vehicle can be, for example, a motor vehicle, such as an automobile. Furthermore, the vehicle can be, for example, a vehicle operable in an at least partially automated or autonomous manner. The vehicle is preferably an automobile operable in a (semi-)autonomous or (semi-)automated manner.

In step a), surroundings data from the surroundings of the vehicle are received (and/or detected). The surroundings data can be ascertained in particular by at least one surroundings sensor of the vehicle. A locating device of the vehicle or the GNSS locating device can receive the surroundings data from the at least one surroundings sensor. The at least one surroundings sensor can be, for example, an optical and/or acoustic surroundings sensor. For example, one or more of the following sensors can be used as surroundings sensors: camera sensor, RADAR sensor, LIDAR sensor, and/or ultrasonic sensor.

In step b), a surroundings model is generated to describe the surroundings of the vehicle by means of the surroundings data received in step a). The surroundings model is generally a digital depiction or representation of surroundings features of the spatial surroundings around the vehicle. In particular, the surroundings model is a (digital) three-dimensional surroundings model. The surroundings model can be ascertained in each case instantaneously for the relevant vehicle and/or a plurality of vehicles (and possibly exchanged via communication connections with a central processing device and/or other vehicles). The surroundings model can be ascertained internally in the vehicle (for example by the GNSS locating device) and/or externally to the vehicle (for example by a central processing device).

In this context, in other words in particular a surroundings model or environmental model relevant for GNSS reception can be created on the basis of surroundings sensors (of the vehicle). The items of surroundings information or environmental information from the model can be processed in a multipath propagation algorithm. The algorithm can be configured, for example, to evaluate (known) items of position information from GNSS satellites (for example ephemerides).

The algorithm can furthermore be configured to calculate a respective line of sight (abbreviated: LoS) to the GNSS satellites, in particular using the items of position information. Furthermore, the algorithm can be configured to carry out a comparison of the line(s) of sight to the surroundings model or environmental model, in particular to ascertain whether a (surroundings) obstacle is within the line of sight.

In addition, the algorithm can be configured to discard the relevant satellite signal in the case of a line of sight which is impaired, in particular interrupted, by the (surroundings) obstacle. Alternatively or additionally, the algorithm can be configured to specify a correction if the line of sight is impaired, in particular interrupted, by the (surroundings) obstacle. In this context, the algorithm can be configured, for example, to calculate a correction value. The algorithm can advantageously operate by means of artificial intelligence (AI)-assisted methods.

In step c), GNSS satellite signals are received from GNSS satellites using a GNSS receiver. GNSS stands here for global navigation satellite system. Corresponding satellite navigation systems are operated, for example, under the names GPS, Galileo, GLONASS, and Beidou. The GNSS receiver can receive the GNSS satellite signals, for example, by means of at least one GNSS antenna of the vehicle. The GNSS receiver can be a component of a GNSS locating device of the vehicle. Locating the vehicle or ascertaining the (ego) position of the vehicle can be carried out in particular by a GNSS locating device of the vehicle by way of runtime measurements of the GNSS satellite signals.

In step d), output data of the GNSS locating device are ascertained from the GNSS satellite signals received in step a), wherein the surroundings model generated in step b) is used to compensate for anomalies of the propagation of the GNSS satellite signals from the GNSS satellites to the GNSS receiver caused by the surroundings. Furthermore, in the ascertainment of the output data by the GNSS locating device, fusions with further sensor data of the vehicle, for example at least one surroundings sensor and/or at least one inertial sensor can also be carried out. For this purpose, for example, a locating filter can be used, such as a Kalman filter. Multipath propagations of the GNSS satellite signals (which result in runtime delays and thus represent propagation anomalies) can be recognized by a multipath filter and in particular compensated for subsequently, for example by the locating filter and/or the multipath filter. The locating filter and/or the multipath filter can be components of the GNSS locating device of the vehicle.

In this context, for example, an offset can be carried out with existing, further satellite signals and/or with (other) correction signals in, for example, a locating algorithm for calculating the navigation solution. Furthermore, an (ego) position of the vehicle can be output with a quality of estimation of the position ascertainment to provide the output data. The quality of estimation can be, for example, an integrity level, such as a so-called protection limit or protection level (abbreviated: PL).

The GNSS locating device can comprise, for example, at least one locating filter, such as a Kalman filter and/or at least one multipath filter. Output data can comprise, for example, one or more of the following output parameters:
  at least one item of position information;
  at least one item of velocity information
  at least one item of confidence information or integrity information (about the confidence or integrity (or reliability), for example, of an estimation of the position information and/or the velocity information),
  at least one item of time information.

The confidence information can be, for example, a confidence space (so-called integrity range/integrity level/protection level), in particular around an item of ascertained position (information) and/or velocity (information).

According to one advantageous embodiment, it is proposed that output data ascertained in step d) contain at least one of the following output parameters:
  at least one item of position information;
  at least one item of velocity information.

The position information generally describes the instantaneous ego position of the vehicle. The velocity information generally describes the instantaneous ego velocity of the vehicle.

According to a further advantageous embodiment, it is proposed that the surroundings data are received from at least one of the following surroundings sensors of the vehicle:
  RADAR sensor,
  camera sensor,
  LIDAR sensor.

For example, an ultrasonic sensor of the vehicle can be used as a further surroundings sensor.

According to a further advantageous embodiment, it is proposed that anomalies compensated for in step d) by means of the surroundings model are reflections, delays, and/or deflections of GNSS satellite signals which are induced by objects in the surroundings of the vehicle.

The objects which are particularly relevant here in the surroundings of the vehicle can be, for example, buildings or houses, infrastructure elements, and/or further road users, which can be located in particular around the vehicle. Traffic signals, road signs, road crossings, tunnels, or the like, for example, come into consideration as infrastructure elements. The further road users can be, for example, other vehicles and/or persons. Other vehicles are relevant in particular if they are taller than the ego vehicle, so that they can possibly impair the GNSS reception (for example in the case of trucks). In particular to estimate the spatial extension of the objects, these can be provided or represented in the surroundings model, for example, with frames characterizing their spatial extension.

According to a further advantageous embodiment, it is proposed that in step d), position parameters are ascertained of GNSS satellites, the GNSS satellite signals of which were received, and used for the determination of anomalies of the propagation of the GNSS satellite signals. The position parameters typically describe the position of the respective GNSS satellites relatively in orbit or relative to the earth (and thus also relative to the GNSS receiver). The position parameters can be ascertained, for example, from ephemerides data on the GNSS satellites.

In this context, it is particularly advantageous if a direct signal route (so-called line of sight; abbreviated: LoS) of the GNSS satellite signals (or at least one satellite signal) from the GNSS satellites to the GNSS receiver is ascertained and it is checked on the basis of the surroundings model whether objects (or at least one object) impair this signal route and (possibly existing) impairments of the signal route are taken into consideration in the determination of the output data. The direct signal route can be ascertained, for example, using the position parameters of the GNSS satellites and estimations based on the received GNSS satellite signals. In particular, it can be checked whether at least one object is located in a direct signal route or the line of sight to at least one of the satellites. The signals received from the relevant satellites can be discarded or corrected accordingly in case of an impairment by at least one object.

According to a further advantageous embodiment, it is proposed that in step d), indirect signal routes of the GNSS satellite signals from the GNSS satellites to the GNSS receiver induced by objects (recognized in the surroundings model) in the surroundings of the vehicle are ascertained and taken into consideration in the determination of the output data. In particular, the indirect signal routes can be used, for example, to ascertain at least one direct signal route. Furthermore, the indirect signal routes can be corrected, for example, by means of at least one correction value to determine the output data. The correction value can be ascertained or calculated in particular as a function of and/or using items of information from the surroundings model.

According to a further advantageous embodiment, it is proposed that in step d), on the basis of the surroundings model, GNSS satellite signals from GNSS satellites are discarded for the determination of the output data, the signal routes of which to the GNSS receiver are impaired by objects (recognized in the surroundings model). The signal routes can be direct or indirect signal routes. In particular, those GNSS satellite signals are discarded, the (direct) signal routes or associated lines of sight of which to the GNSS receiver are significantly impaired, in particular interrupted, by objects recognized in the surroundings model.

According to a further aspect, a computer program is proposed for carrying out a method presented here. In other words, this relates in particular to a computer program (product), comprising commands which, upon execution of the program by a computer, prompt this computer to carry out a method described here.

According to a further aspect, a machine-readable storage medium is proposed, on which the computer program proposed here is saved or stored. The machine-readable storage medium is generally a computer-readable data carrier.

According to a further aspect, a GNSS locating device for a vehicle is proposed, wherein the GNSS locating device is configured to carry out a method described here. The GNSS locating device can comprise, for example, a computer and/or a control unit (controller), which can execute commands to carry out the method. For this purpose, the computer or the control unit can execute, for example, the specified computer program. For example, the computer or the control unit can access the specified storage medium to be able to execute the computer program. The GNSS locating device can be, for example, a movement and position sensor, which is in particular arranged in or on the vehicle.

The details, features, and advantageous embodiments explained in conjunction with the method can correspondingly also occur in the computer program presented here and/or the storage medium and/or the GNSS locating device and vice versa. Reference is insofar made to the entirety of the statements made therein for the more detailed characterization of the features.

BRIEF DESCRIPTION OF THE DRAWING

The solution presented here and its technical environment are explained in more detail hereinafter on the basis of the figures. It is to be noted that the disclosure is not to be restricted by the exemplary embodiments shown. In particular, it is also possible, if not explicitly described otherwise, to extract partial aspects of the substantive matter explained in the figures and combine them with other components and/or findings from other figures and/or the present description. In the schematic figures.

DETAILED DESCRIPTION

Figure 1:
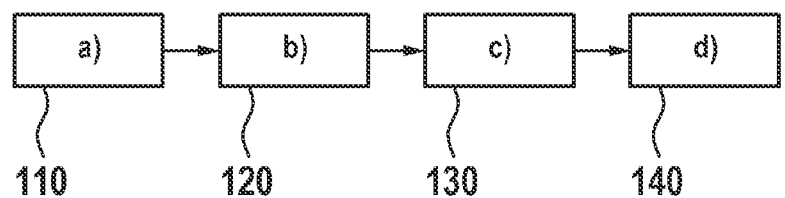
FIG. 1: shows an exemplary sequence of the method presented here.

FIG. 1 schematically shows an exemplary sequence of the method presented here. The method is used to ascertain output data 5 of a GNSS locating device 11 based on GNSS satellite signals 1 in a vehicle 2 (cf. FIGS. 2, 3). The sequence of steps a), b), c), and d) illustrated by blocks 110, 120, 130, and 140 is exemplary and can be passed through for example at least once in the illustrated sequence to carry out the method.

In block 110, according to step a), surroundings data are received from the surroundings of the vehicle 2. In block 120, according to step b), a surroundings model 12 is generated to describe the surroundings of the vehicle by means of the surroundings data received in step a). In block 130, according to step c), GNSS satellite signals 1 are received from GNSS satellites 3 using a GNSS receiver 4. In block 140, according to step d), output data 5 of the locating device 11 are ascertained from the GNSS satellite signals 1 received in step a), wherein the surroundings model 12 generated in step b) is used to compensate for anomalies of the propagation of the GNSS satellite signals 1 from the GNSS satellites 3 to the GNSS receiver 4 caused by the surroundings.

The output data 5 ascertained in step d) can contain at least one of the following output parameters: at least one item of position information (ego position of the vehicle) and/or at least one item of velocity information (ego velocity of the vehicle).

Figure 2:
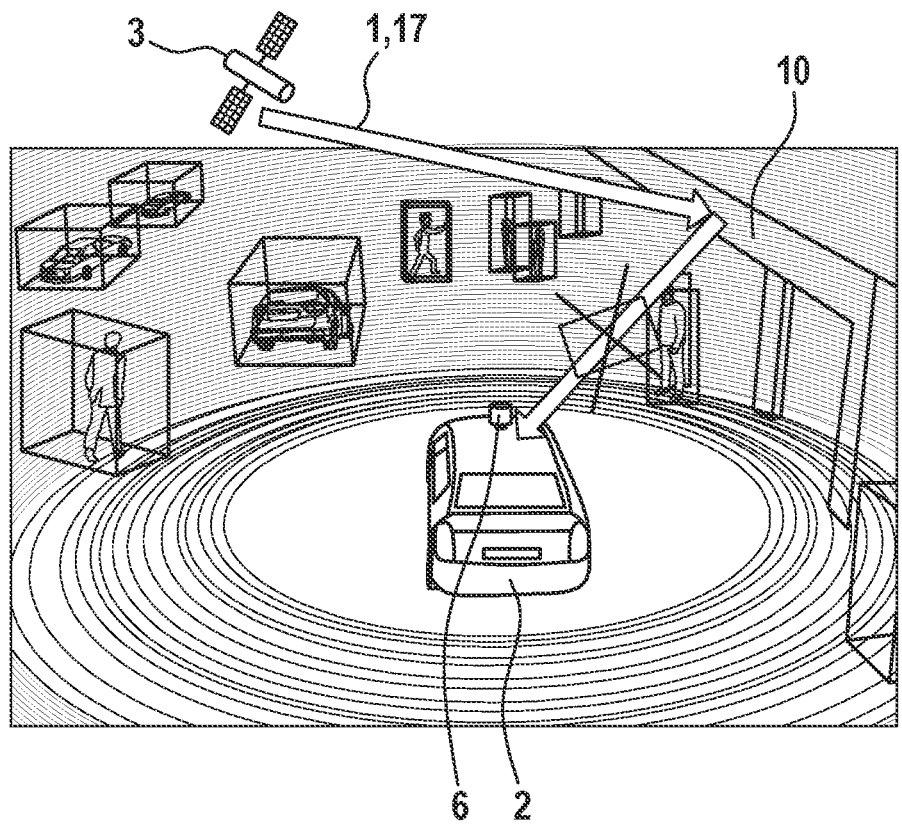
FIG. 2: shows an exemplary application of the method presented here.

FIG. 2 schematically shows an exemplary application of the method presented here. FIG. 2 shows by way of example that anomalies compensated for in step d) by means of the surroundings model 12 can be reflections, delays, and/or deflections of GNSS satellite signals 1 which are induced by objects 10 in the surroundings of the vehicle 2. The object 10 is here, for example, a façade of a house in the surroundings of the vehicle 2. For example, a reflection of the GNSS satellite signal 1 takes place on the façade, which results in a runtime delay and thus an anomaly. Therefore, the GNSS satellite signal 1 propagates here, for example, along a so-called indirect signal route 17.

Possibly (alternatively or additionally), other road users and/or infrastructure devices, such as traffic signals and/or road signs, can also come into consideration as further objects 10 in the surroundings of the vehicle 2. Furthermore, it is shown by way of example in FIG. 2 that the surroundings data can be received at least from a surroundings sensor 6 of the vehicle 2.

Figure 3:
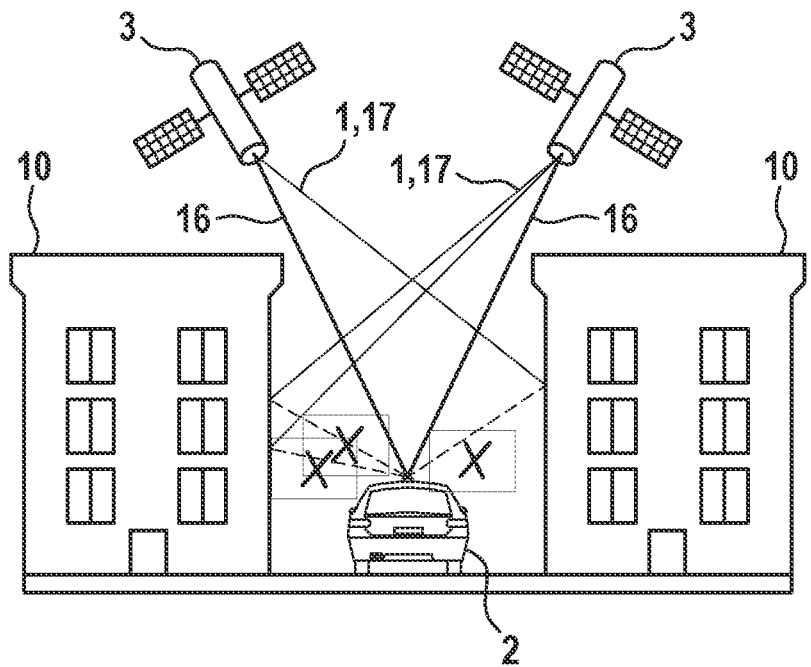
FIG. 3: shows a further exemplary application of the method presented here.

FIG. 3 schematically shows a further exemplary application of the method presented here. It can be illustrated on the basis of the illustration according to FIG. 3 that in step d), position parameters can be ascertained of GNSS satellites 3, the GNSS satellite signals 1 of which were received, and can be used for the determination of anomalies of the propagation of the GNSS satellite signals 1. The position parameters can be ascertained, for example, by so-called satellite tracking.

In this context, for example, a direct signal route 16 (so-called line of sight; abbreviated LoS) of the GNSS satellite signals 1 from the GNSS satellites 3 to the GNSS receiver 4 can be ascertained and it can be checked on the basis of the surroundings model 12 whether objects 10 (houses here by way of example) impair this signal route 16.

Impairments of the signal route 16 can therefore be taken into consideration in the determination of the output data 5.

Furthermore, it is shown by way of example in FIG. 3 that in step d), indirect signal routes 17 of the GNSS satellite signals 1 from the GNSS satellites 3 to the GNSS receiver 4 induced by objects 10 (recognized in the surroundings model 12) in the surroundings of the vehicle 2 can be ascertained and taken into consideration in the determination of the output data 5. For example, a consideration is possible if a direct signal route 16 can be ascertained from the GNSS satellite signals 1, which is not impaired by an object 10.

Furthermore, however, it can also be provided that in step d), on the basis of the surroundings model 12, GNSS satellite signals 1 from the GNSS satellites 3 are discarded for the determination of the output data 5, the signal routes 16, 17 of which to the GNSS receiver 4 are impaired by objects 10 recognized in the surroundings model 12. This is shown in each case with an X in FIG. 3 for illustration.

Figure 4:
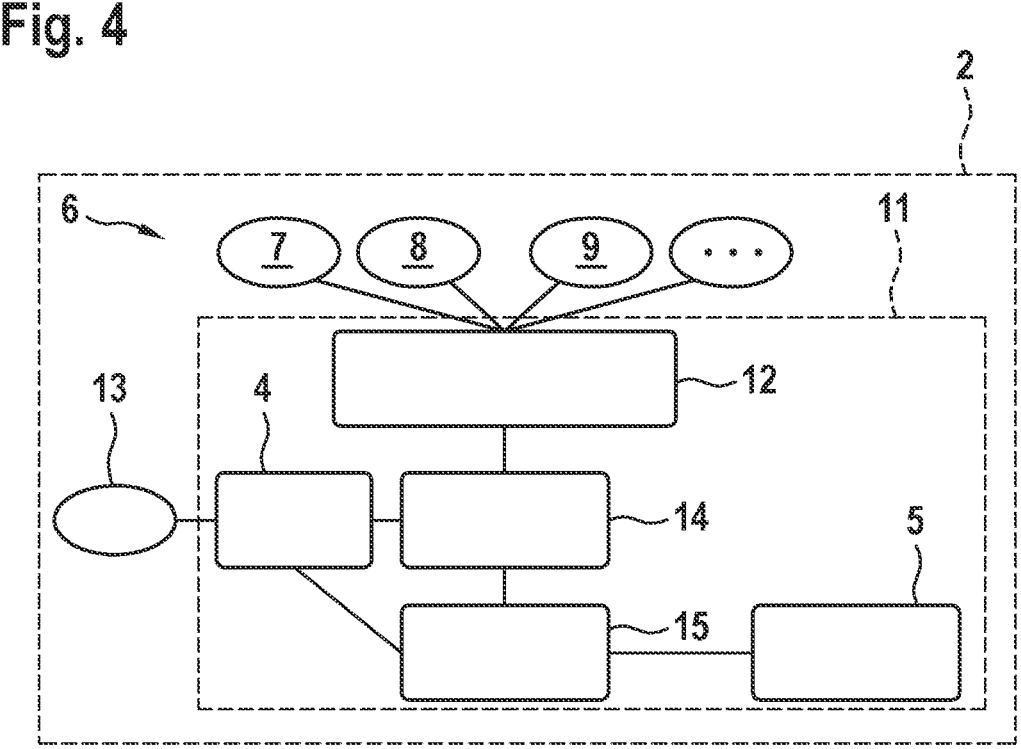
FIG. 4: shows an exemplary structure of the GNSS locating device presented here for a vehicle.

FIG. 4 schematically shows an exemplary structure of the GNSS locating device 11 presented here for a vehicle 2. The GNSS locating device 11 is configured to carry out the method described here.

A GNSS receiver 4 of the GNSS locating device 11 can receive GNSS satellite signals 1 from a GNSS antenna 13 of the vehicle 2. Furthermore, the GNSS locating device 11 can receive surroundings data at least from one of the following surroundings sensors 6 of the vehicle 2: RADAR sensor 7, camera sensor 8, and/or LIDAR sensor 9. The surroundings model 12 can be created by means of the surroundings data.

The items of information from the surroundings model 12 can be taken into consideration, for example, in a multipath filter 14, which can ascertain a possibly existing impairment of the received GNSS satellite signals 1. The multipath filter 14 can ascertain, for example, whether an impairment exists. In this context, the multipath filter 14 can ascertain, for example, a "field of view" of the GNSS antenna 13 from the surroundings model 12.

Furthermore, the multipath filter 14 can ascertain, for example, whether and possibly how an existing impairment can be compensated for. For example, the multipath filter 14 can carry out a line of sight (LoS) assessment and filter out GNSS satellites 3, to which no direct signal route 16 can be ascertained (so-called non-LoS satellites). The multipath filter 14 can (alternatively or additionally) pass on the corresponding items of information to a locating filter 15 of the GNSS locating device 11.

The locating filter 15 (for example a Kalman filter) can ascertain the output data 5 by means of these items of information using GNSS data from the GNSS receiver 4. For this purpose, for example, it can carry out at least one sensor fusion with further sensors, such as surroundings sensors 6 and/or inertial sensors of the vehicle 2.

The invention claimed is:

1. A method for ascertaining output data of a global navigation satellite system (GNSS) locating device based on GNSS satellite signals in a vehicle, the method comprising:
receiving surroundings data from surroundings of the vehicle;
generating a surroundings model to describe the surroundings of the vehicle based on the received surroundings data;
receiving the GNSS satellite signals from GNSS satellites using a GNSS receiver;
ascertaining the output data of the GNSS locating device from the received GNSS satellite signals; and
using the surroundings model to compensate for anomalies, caused by the surroundings of the vehicle, of a propagation of the GNSS satellite signals from the GNSS satellites to the GNSS receiver.

2. The method according to claim 1, wherein the ascertained output data includes at least one of an item of position information and an item of velocity information.

3. The method according to claim 1, wherein:
the surroundings data are received from at least one surroundings sensor of the vehicle, and
the at least one surroundings sensor includes at least one of a radar sensor, a camera sensor, and a lidar sensor.

4. The method according to claim 1, wherein the anomalies include reflections, delays, and/or deflections of the GNSS satellite signals which are induced by objects in the surroundings of the vehicle.

5. The method according to claim 1, wherein ascertaining the output data includes ascertaining position parameters of the GNSS satellites, the GNSS satellite signals of which were received and are used for the compensation of anomalies of the propagation of the GNSS satellite signals.

6. A method for ascertaining output data of a global navigation satellite system (GNSS) locating device based on GNSS satellite signals in a vehicle, the method comprising:
receiving surroundings data from surroundings of the vehicle;
generating a surroundings model to describe the surroundings of the vehicle based on the received surroundings data;
receiving the GNSS satellite signals from GNSS satellites using a GNSS receiver;
ascertaining the output data of the GNSS locating device from the received GNSS satellite signals;
using the surroundings model to compensate for anomalies, caused by the surroundings of the vehicle, of a propagation of the GNSS satellite signals from the GNSS satellites to the GNSS receiver;
ascertaining a direct signal route of the GNSS satellite signals from the GNSS satellites to the GNSS receiver;
checking the ascertained direct signal route based on the surroundings model whether objects impair the direct signal route; and
determining the output data based on the impairments of the direct signal route.

7. The method according to claim 1, wherein ascertaining the output data includes ascertaining indirect signal routes of the GNSS satellite signals from the GNSS satellites to the GNSS receiver induced by objects in the surroundings of the vehicle and determining the output data based on the indirect signal routes.

8. The method according to claim 1, wherein ascertaining the output data includes discarding, based on the surroundings model, the GNSS satellite signals, having signal routes of which to the GNSS receiver are impaired by objects recognized in the surroundings model.

9. The method according to claim 1, wherein a computer program is configured to carrying out the method.

10. The method according to claim 9, wherein the computer program is stored on a non-transitory machine-readable storage medium.

11. The method according to claim 1, wherein the GNSS locating device is configured to carry out the method.

12. The method according to claim 6, wherein the ascertained output data includes at least one of an item of position information and an item of velocity information.

13. The method according to claim 6, wherein:
the surroundings data are received from at least one surroundings sensor of the vehicle, and the at least one surroundings sensor includes at least one of a radar sensor, a camera sensor, and a lidar sensor.

14. The method according to claim 6, wherein the anomalies include reflections, delays, and/or deflections of the GNSS satellite signals which are induced by objects in the surroundings of the vehicle.

15. The method according to claim 6, wherein ascertaining the output data includes ascertaining position parameters of the GNSS satellites, the GNSS satellite signals of which were received and are used for the compensation of anomalies of the propagation of the GNSS satellite signals.

16. The method according to claim 6, wherein ascertaining the output data includes ascertaining indirect signal routes of the GNSS satellite signals from the GNSS satellites to the GNSS receiver induced by objects in the surroundings of the vehicle and determining the output data based on the indirect signal routes.

17. The method according to claim 6, wherein ascertaining the output data includes discarding, based on the surroundings model, the GNSS satellite signals, having signal routes of which to the GNSS receiver are impaired by objects recognized in the surroundings model.

* * * * *